US011349521B2

(12) United States Patent
Tahara et al.

(10) Patent No.: US 11,349,521 B2
(45) Date of Patent: May 31, 2022

(54) RADIO-FREQUENCY SIGNAL TRANSMITTING AND RECEIVING CIRCUIT

(71) Applicant: Murata Manufacturing Co., Ltd., Kyoto (JP)

(72) Inventors: Kenji Tahara, Kyoto (JP); Seikoh Ono, Kyoto (JP); Kunihiro Watanabe, Kyoto (JP); Hiroshi Masuda, Kyoto (JP); Naohide Tomita, Kyoto (JP); Takeshi Kogure, Kyoto (JP); Yusuke Tanaka, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 17/235,309

(22) Filed: Apr. 20, 2021

(65) Prior Publication Data

US 2021/0328618 A1    Oct. 21, 2021

(30) Foreign Application Priority Data

Apr. 21, 2020 (JP) .............................. JP2020-075446

(51) Int. Cl.
*H04B 1/44* (2006.01)
(52) U.S. Cl.
CPC ..................................... *H04B 1/44* (2013.01)
(58) Field of Classification Search
CPC ... H04B 1/04; H04B 1/10; H04B 1/38; H04B 1/40; H04B 1/44; H04B 1/0458; H03F 1/195; H03F 1/245
See application file for complete search history.

(56) References Cited

U.S. PATENT DOCUMENTS

| | | | |
|---|---|---|---|
| 2006/0199549 | A1 | 9/2006 | Lee et al. |
| 2008/0212552 | A1 | 9/2008 | Fukamachi et al. |
| 2009/0207764 | A1 | 8/2009 | Fukamachi et al. |
| 2015/0214995 | A1 | 7/2015 | Kanemaru |
| 2019/0296783 | A1* | 9/2019 | Naniwa ..................... H01P 5/02 |
| 2020/0028479 | A1 | 1/2020 | Ta et al. |
| 2020/0228155 | A1* | 7/2020 | Kido ...................... H03H 9/568 |

(Continued)

FOREIGN PATENT DOCUMENTS

| | | |
|---|---|---|
| CN | 101438505 A | 5/2009 |
| CN | 108847865 A | 11/2018 |

*Primary Examiner* — Thanh C Le
(74) *Attorney, Agent, or Firm* — Pearne & Gordon LLP

(57) ABSTRACT

A radio-frequency signal transmitting and receiving circuit includes a power amplifier, a transmission band pass filter configured to transmit a radio-frequency input signal, a first reception band pass filter configured to transmit a first radio-frequency reception signal, a first low-noise amplifier configured to amplify the first radio-frequency reception signal and output a first radio-frequency output signal, a first transmitting and receiving filter having a first end and a second end, the first end being electrically connected to a first antenna terminal, and a switch configured to electrically connect the transmission band pass filter to the second end of the first transmitting and receiving filter to output the radio-frequency input signal to the first antenna terminal and electrically connect the second end of the first transmitting and receiving filter to the first reception band pass filter to receive the first radio-frequency reception signal from the first antenna terminal.

16 Claims, 14 Drawing Sheets

(56) References Cited

U.S. PATENT DOCUMENTS

2021/0211146 A1* 7/2021 Park ................... H04B 1/0057
2021/0351810 A1* 11/2021 Gorbachov ............... H03F 3/24
2021/0384924 A1* 12/2021 Nakamura ......... H03H 9/02574
2021/0384925 A1* 12/2021 Nagamori ................ H04B 1/38

* cited by examiner

RADIO-FREQUENCY SIGNAL TRANSMITTING AND RECEIVING CIRCUIT

CROSS REFERENCE TO RELATED APPLICATION

This application claims priority from Japanese Patent Application No. 2020-075446 filed on Apr. 21, 2020. The content of this application is incorporated herein by reference in its entirety.

BACKGROUND OF THE DISCLOSURE

Field of the Disclosure

The present disclosure relates to a radio-frequency signal transmitting and receiving circuit.

Description of the Related Art

A mobile communication device such as a mobile phone device includes a front-end circuit that outputs a radio-frequency transmission signal to an antenna and receives a radio-frequency reception signal from the antenna.

The fifth-generation mobile communication system (5G) is being put into practical use. It is desirable to minimize or reduce interference between 5G signals and other signals (such as fourth-generation mobile communication system (4G) or WiFi signals).

BRIEF SUMMARY OF THE DISCLOSURE

Accordingly, it is an object of the present disclosure to minimize or reduce interference between signals.

According to preferred embodiments of the present disclosure, a radio-frequency signal transmitting and receiving circuit includes a power amplifier configured to amplify a radio-frequency input signal, a transmission band pass filter configured to transmit the radio-frequency input signal amplified by the power amplifier, a first reception band pass filter configured to transmit a first radio-frequency reception signal, a first low-noise amplifier configured to amplify the first radio-frequency reception signal transmitted through the first reception band pass filter and output a first radio-frequency output signal, a first transmitting and receiving filter having a first end and a second end, the first end being electrically connected to a first antenna terminal, the first transmitting and receiving filter being configured to transmit the radio-frequency input signal and the first radio-frequency reception signal and attenuate a radio-frequency signal having a frequency equal to at least one of frequencies, the frequencies being different from a frequency of the radio-frequency input signal and a frequency of the first radio-frequency reception signal, and a switch configured to electrically connect the transmission band pass filter to the second end of the first transmitting and receiving filter to output the radio-frequency input signal to the first antenna terminal as a radio-frequency transmission signal and electrically connect the second end of the first transmitting and receiving filter to the first reception band pass filter to receive the first radio-frequency reception signal from the first antenna terminal.

In the radio-frequency signal transmitting and receiving circuit, the radio-frequency input signal and the first radio-frequency reception signal may be radio-frequency signals in band n77 for a fifth-generation mobile communication system, and the first transmitting and receiving filter may be configured to transmit the radio-frequency input signal and the first radio-frequency reception signal and attenuate a radio-frequency signal for uplink in Band 3 for a fourth-generation mobile communication system and a radio-frequency signal for uplink in Band 1 for the fourth-generation mobile communication system.

In the radio-frequency signal transmitting and receiving circuit, the first transmitting and receiving filter may be a high pass filter or a notch filter.

The radio-frequency signal transmitting and receiving circuit may further include a second reception band pass filter configured to transmit a second radio-frequency reception signal, a second low-noise amplifier configured to amplify the second radio-frequency reception signal transmitted through the second reception band pass filter and output a second radio-frequency output signal, and a second transmitting and receiving filter having a first end and a second end, the first end being electrically connected to a second antenna terminal, the second transmitting and receiving filter being configured to transmit the radio-frequency input signal and the second radio-frequency reception signal and attenuate a radio-frequency signal having a frequency equal to at least one of frequencies, the frequencies being different from a frequency of the radio-frequency input signal and a frequency of the second radio-frequency reception signal. The switch may be configured to electrically connect the transmission band pass filter to the second end of the second transmitting and receiving filter to output the radio-frequency input signal to the second antenna terminal as the radio-frequency transmission signal and electrically connect the second end of the second transmitting and receiving filter to the second reception band pass filter to receive the second radio-frequency reception signal from the second antenna terminal.

In the radio-frequency signal transmitting and receiving circuit, the radio-frequency input signal and the second radio-frequency reception signal may be radio-frequency signals in band n77 for a fifth-generation mobile communication system, and the second transmitting and receiving filter may be configured to transmit the radio-frequency input signal and the second radio-frequency reception signal and attenuate a radio-frequency signal for uplink in Band 3 for a fourth-generation mobile communication system and a radio-frequency signal for uplink in Band 1 for the fourth-generation mobile communication system.

In the radio-frequency signal transmitting and receiving circuit, the second transmitting and receiving filter may be a high pass filter or a notch filter.

According to preferred embodiments of the present disclosure, it is possible to minimize or reduce interference between signals.

Other features, elements, characteristics and advantages of the present disclosure will become more apparent from the following detailed description of preferred embodiments of the present disclosure with reference to the attached drawings.

DETAILED DESCRIPTION OF THE DISCLOSURE

The following describes radio-frequency signal transmitting and receiving circuits according to embodiments of the present disclosure in detail with reference to the drawings. The present disclosure is not limited by the embodiments. It is to be understood that the embodiments are illustrative and components presented in different embodiments may be partially replaced or combined. Features common to a first embodiment will not be described in second and subsequent embodiments, and only differences will be described. In particular, similar operations and effects achieved with similar configurations will not be described again in the individual embodiments.

First Embodiment and Comparative Example

Prior to the description of the first embodiment, a comparative example will be described for ease of understanding of the first embodiment.

Comparative Example

Figure 1:
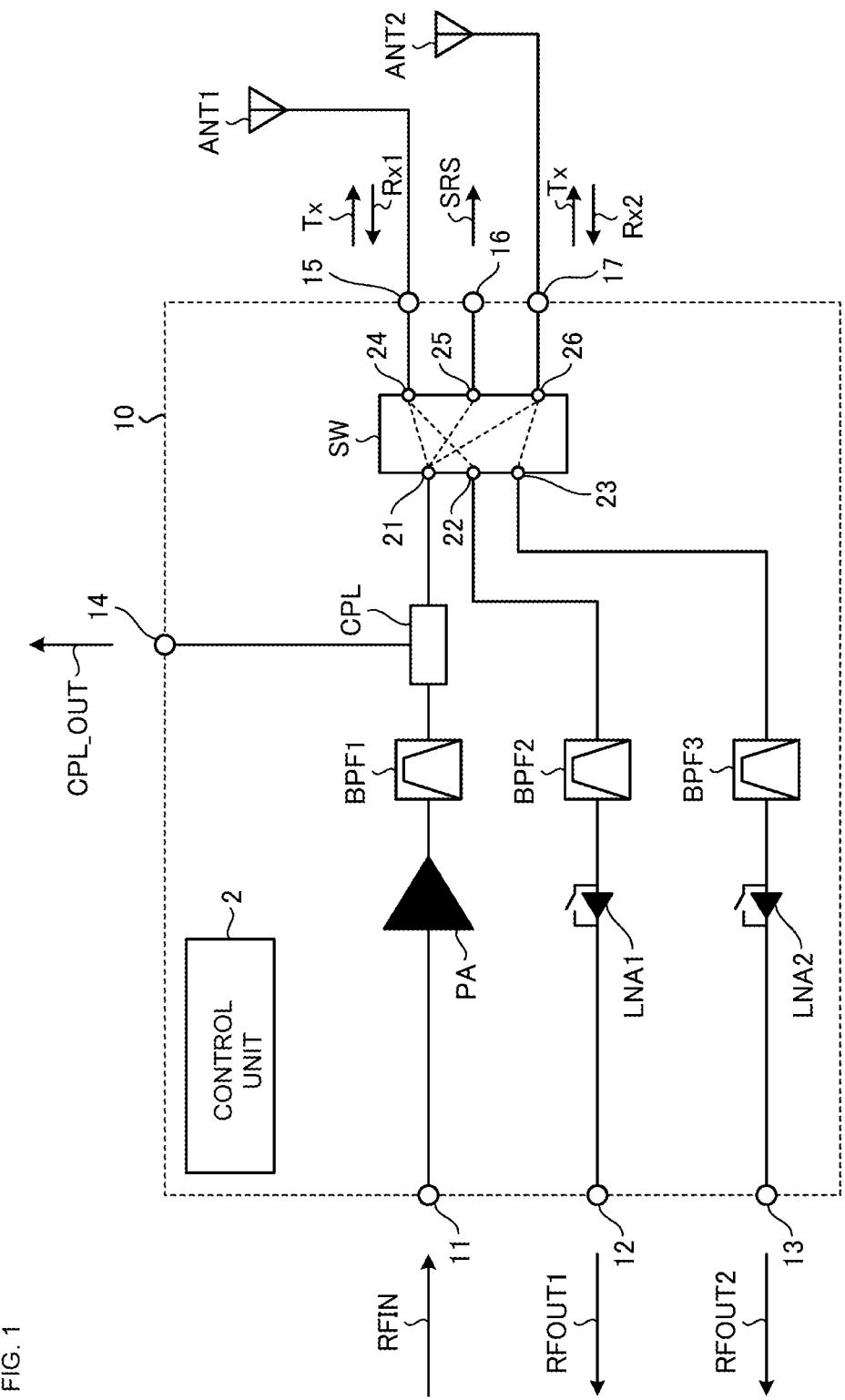
FIG. 1 is a diagram illustrating a configuration of a radio-frequency signal transmitting and receiving circuit according to a comparative example.

FIG. 1 is a diagram illustrating a configuration of a radio-frequency signal transmitting and receiving circuit 10 according to a comparative example. The radio-frequency signal transmitting and receiving circuit 10 is included in a mobile communication device such as a mobile phone device and is a one-upstream two-downstream front-end module (front-end circuit) capable of outputting a radio-frequency transmission signal Tx to antennas ANT1 and ANT2 and receiving radio-frequency reception signals Rx1 and Rx2 from the antennas ANT1 and ANT2. The radio-frequency signal transmitting and receiving circuit 10 may be implemented as a hybrid integrated circuit (IC) having a plurality of components (such as semiconductor ICs) on a single substrate, although the present disclosure is not limited thereto.

The radio-frequency reception signal Rx1 corresponds to a "first radio-frequency reception signal" in the present disclosure. The radio-frequency reception signal Rx2 corresponds to a "second radio-frequency reception signal" in the present disclosure.

The radio-frequency signal transmitting and receiving circuit 10 includes a control unit 2, a power amplifier PA, low-noise amplifiers LNA1 and LNA2, band pass filters BPF1, BPF2, and BPF3, a coupler CPL, and a switch SW. The control unit 2 controls the power amplifier PA, the low-noise amplifiers LNA1 and LNA2, the coupler CPL, and the switch SW.

The low-noise amplifier LNA1 corresponds to a "first low-noise amplifier" in the present disclosure. The low-noise amplifier LNA2 corresponds to a "second low-noise amplifier" in the present disclosure. The band pass filter BPF1 corresponds to a "transmission band pass filter" in the present disclosure. The band pass filter BPF2 corresponds to a "first reception band pass filter" in the present disclosure. The band pass filter BPF3 corresponds to a "second reception band pass filter" in the present disclosure.

The power amplifier PA amplifies a radio-frequency input signal RFIN inputted to a terminal 11 from the preceding circuit (for example, a radio-frequency IC (RFIC)) and outputs the amplified radio-frequency input signal RFIN to the band pass filter BPF1.

The band pass filter BPF1 transmits the radio-frequency input signal RFIN amplified by the power amplifier PA and outputs the radio-frequency input signal RFIN to the coupler CPL. The coupler CPL detects the radio-frequency input signal RFIN transmitted through the band pass filter BPF1 and outputs a detection signal CPL OUT from a terminal 14. The radio-frequency input signal RFIN transmitted through the coupler CPL is inputted to a terminal 21 of the switch SW.

The switch SW includes a first group of terminals 21, 22, and 23 and a second group of terminals 24, 25, and 26. The switch SW provides electrical connection between the terminals 21, 22, and 23 in the first group and the terminals 24, 25, and 26 in the second group.

The terminal 24 of the switch SW is electrically connected to the antenna ANT1 via a first antenna terminal 15. The terminal 26 of the switch SW is electrically connected to the antenna ANT2 via a second antenna terminal 17. The terminal 25 of the switch SW is electrically connected to a terminal 16.

The switch SW electrically connects the terminal 21 to the terminal 24 or the terminal 26 to transmit the radio-frequency transmission signal Tx. The switch SW electrically connects the terminal 21 to the terminal 25 to transmit a sounding reference signal (SRS).

When the switch SW electrically connects the terminals 21 and 24, the radio-frequency input signal RFIN transmitted through the coupler CPL is outputted to the antenna ANT1 as the radio-frequency transmission signal Tx via the terminal 21, the terminal 24, and the first antenna terminal 15.

When the switch SW electrically connects the terminals 21 and 26, the radio-frequency input signal RFIN transmitted through the coupler CPL is outputted to the antenna ANT2 as the radio-frequency transmission signal Tx via the terminal 21, the terminal 26, and the second antenna terminal 17.

The switch SW electrically connects the terminals 22 and 24 to receive the radio-frequency reception signal Rx1, and electrically connects the terminals 23 and 26 to receive the radio-frequency reception signal Rx2.

When the switch SW electrically connects the terminals 22 and 24, the radio-frequency reception signal Rx1 received by the antenna ANT1 is inputted to the band pass filter BPF2 via the first antenna terminal 15, the terminal 24, and the terminal 22. The band pass filter BPF2 transmits the radio-frequency reception signal Rx1 and outputs the radio-frequency reception signal Rx1 to the low-noise amplifier LNA1. The low-noise amplifier LNA1 amplifies the radio-frequency reception signal Rx1 transmitted through the band pass filter BPF2 and outputs the amplified radio-frequency reception signal Rx1 from a terminal 12 as a radio-frequency output signal RFOUT1.

The radio-frequency output signal RFOUT1 corresponds to a "first radio-frequency output signal" in the present disclosure.

When the switch SW electrically connects the terminals 23 and 26, the radio-frequency reception signal Rx2 received by the antenna ANT2 is inputted to the band pass filter BPF3 via the second antenna terminal 17, the terminal 26, and the terminal 23. The band pass filter BPF3 transmits the radio-frequency reception signal Rx2 and outputs the radio-frequency reception signal Rx2 to the low-noise amplifier LNA2. The low-noise amplifier LNA2 amplifies the radio-frequency reception signal Rx2 transmitted through the band pass filter BPF3 and outputs the amplified radio-frequency reception signal Rx2 from a terminal 13 as a radio-frequency output signal RFOUT2.

The radio-frequency output signal RFOUT2 corresponds to a "second radio-frequency output signal" in the present disclosure.

Figure 2:
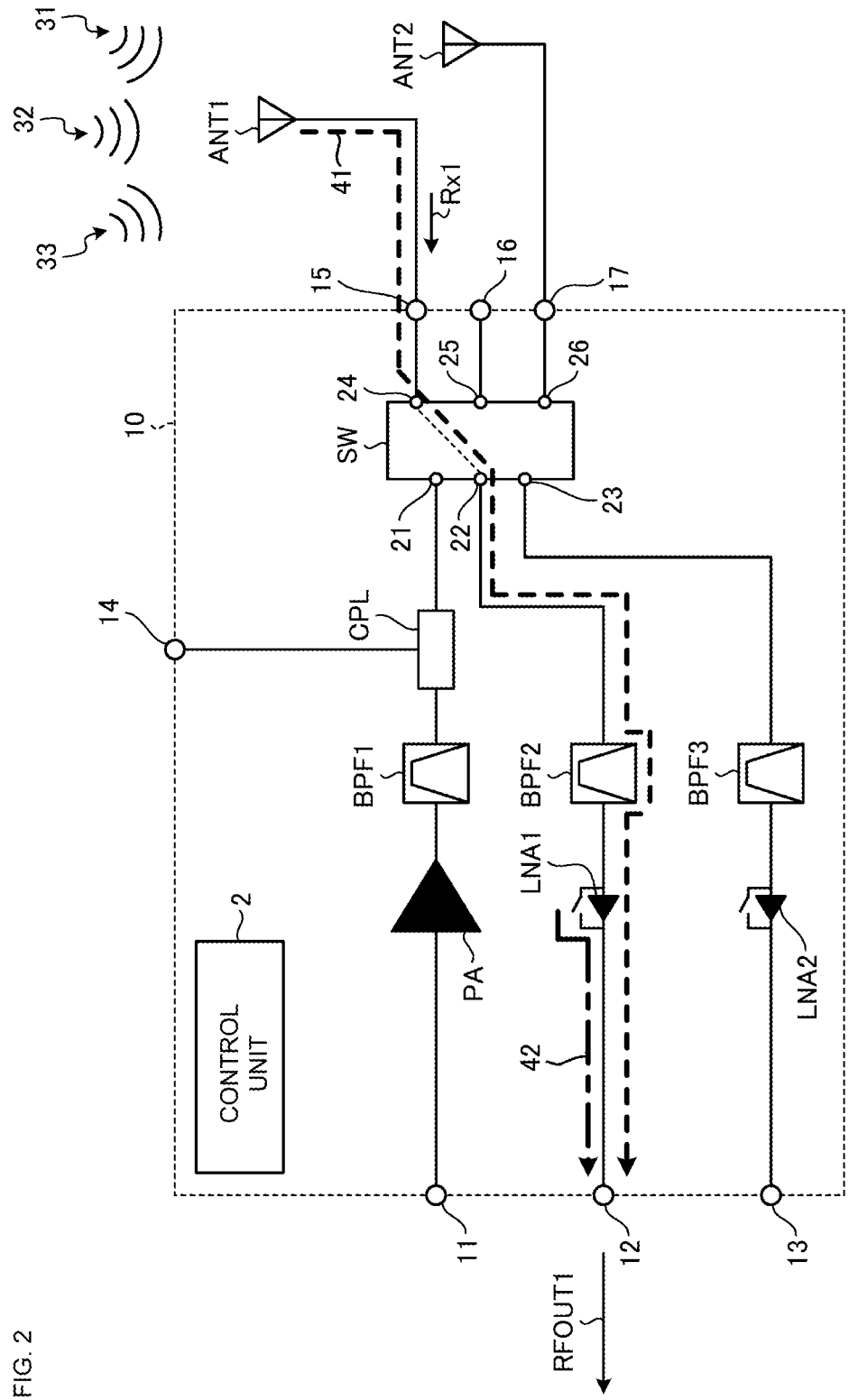
FIG. 2 is a diagram illustrating the radio-frequency signal transmitting and receiving circuit according to the comparative example during reception.

FIG. 2 is a diagram illustrating the radio-frequency signal transmitting and receiving circuit 10 according to the comparative example during reception. Specifically, FIG. 2 illustrates the radio-frequency signal transmitting and receiving circuit 10 when the antenna ANT1 receives a radio wave 31 of band n77 for the fifth-generation mobile communication system (5G) (hereinafter referred to as "5G band n77"). The radio wave 31 in 5G band n77 has a frequency range of 3300 megahertz (MHz) to 4200 MHz. An arrow 41 indicates a received-signal path. 5G band n77 covers frequencies that overlap the frequencies of bands 42, 43, and 48 for the fourth-generation mobile communication system (4G).

The antenna ANT1 receives the radio wave 31 and outputs the radio-frequency reception signal Rx1 to the first antenna terminal 15. At this time, the antenna ANT1 also receives a radio wave 32 for uplink in Band 3 for 4G (hereinafter referred to as "4G Band 3") and a radio wave 33 for uplink in 4G Band 1 for 4G (hereinafter referred to as "4G Band 1"). The radio wave 32 for uplink in 4G Band 3 has a frequency range of 1710 MHz to 1785 MHz. The radio wave 33 for uplink in 4G Band 1 has a frequency range of 1920 MHz to 1980 MHz. The radio wave 32 for uplink in 4G Band 3 and the radio wave 33 for uplink in 4G Band 1 may be transmitted from the mobile communication device including the radio-frequency signal transmitting and receiving circuit 10 or may be transmitted from any other device.

The radio-frequency reception signal Rx1 including a radio-frequency signal in 5G band n77 and radio-frequency signals for uplink in 4G Bands 1 and 3 travels through the first antenna terminal 15, the terminal 24, and the terminal 22 and is inputted to the band pass filter BPF2. The band pass filter BPF2 transmits the radio-frequency reception signal Rx1 and outputs the radio-frequency reception signal Rx1 to the low-noise amplifier LNA1. The low-noise amplifier LNA1 amplifies the radio-frequency reception signal Rx1 transmitted through the band pass filter BPF2 and outputs the amplified radio-frequency reception signal Rx1 from the terminal 12 as the radio-frequency output signal RFOUT1.

The low-noise amplifier LNA1 may produce harmonics due to the signal distortion or the like caused by non-linear elements or the like. The harmonics include, for example, a second harmonic of the radio-frequency signal for uplink in 4G Band 3 and a second harmonic of the radio-frequency signal for uplink in 4G Band 1. The second harmonic of the radio-frequency signal for uplink in 4G Band 3 has a frequency range of 3420 MHz to 3570 MHz. The second harmonic of the radio-frequency signal for uplink in 4G Band 1 has a frequency range of 3840 MHz to 3960 MHz. As indicated by an arrow 42, the harmonics are produced in the low-noise amplifier LNA1 and are outputted from the terminal 12.

The radio-frequency output signal RFOUT1 outputted from the terminal 12 includes the radio-frequency signal in 5G band n77 and the second harmonics of the radio-frequency signals for uplink in 4G Bands 1 and 3.

Figure 3:
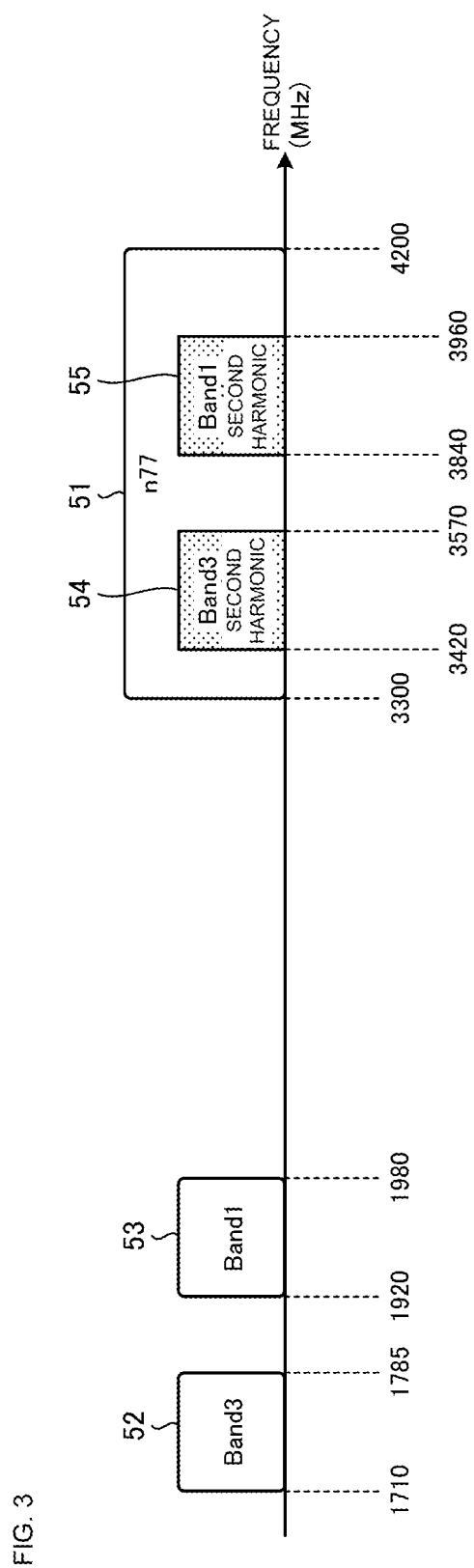
FIG. 3 is a diagram illustrating frequency bands of a radio-frequency signal in 5G band n77 and radio-frequency signals for uplink in 4G Bands 1 and 3.

FIG. 3 is a diagram illustrating frequency bands of a radio-frequency signal in 5G band n77 and radio-frequency signals for uplink in 4G Bands 1 and 3.

A frequency band 51 represents the frequency band of a radio-frequency signal in 5G band n77. The frequency band 51 ranges from 3300 MHz to 4200 MHz.

A frequency band 52 represents the frequency band of a radio-frequency signal for uplink in 4G Band 3. The frequency band 52 ranges from 1710 MHz to 1785 MHz.

A frequency band 53 represents the frequency band of a radio-frequency signal for uplink in 4G Band 1. The frequency band 53 ranges from 1920 MHz to 1980 MHz.

A frequency band 54 represents the frequency band of the second harmonic of a radio-frequency signal for uplink in 4G Band 3. The frequency band 54 ranges from 3420 MHz to 3570 MHz.

A frequency band 55 represents the frequency band of the second harmonic of a radio-frequency signal for uplink in 4G Band 1. The frequency band 55 ranges from 3840 MHz to 3960 MHz.

As illustrated in FIG. 3, the frequency bands 54 and 55 are included in the frequency band 51. That is, the frequency bands of the second harmonics of radio-frequency signals for uplink in 4G Bands 1 and 3 are included in the frequency band of a radio-frequency signal in 5G band n77. In other words, the radio-frequency output signal RFOUT1 includes, as an unwanted signal (noise), the second harmonics of the respective radio-frequency signals for uplink in 4G Bands 1 and 3. The preceding circuit, which has received the radio-frequency output signal RFOUT1 outputted from the terminal 12, has low receiving sensitivity.

Figure 4:
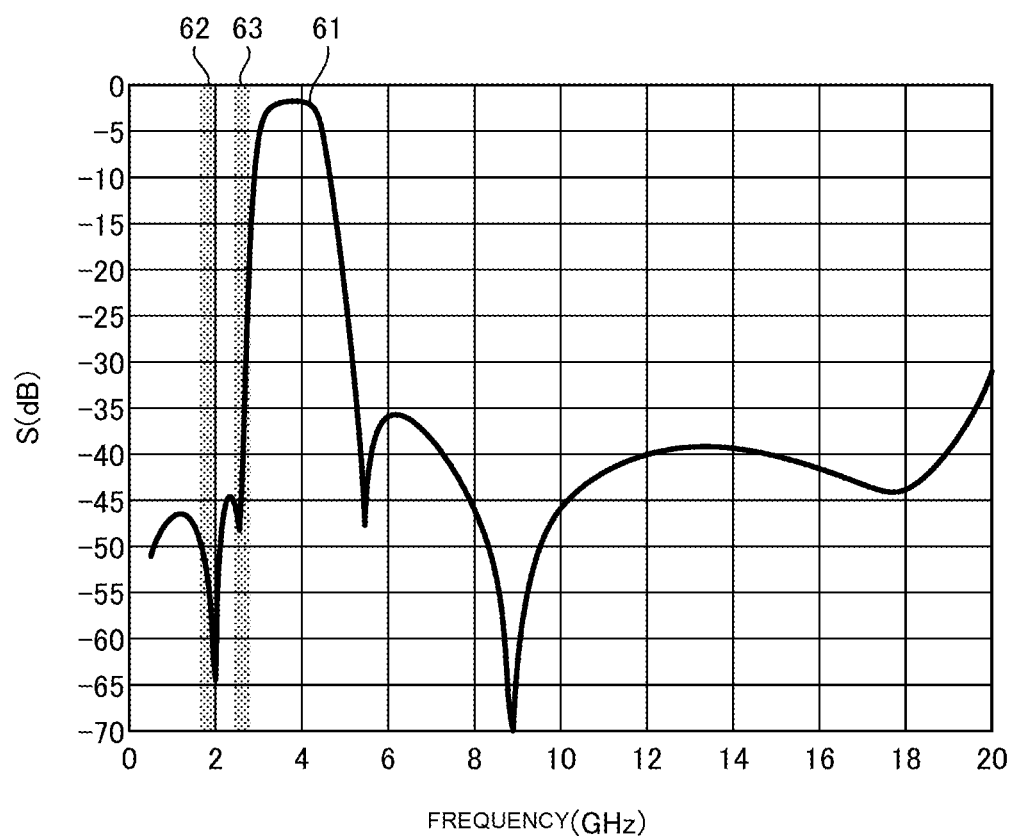
FIG. 4 is a diagram illustrating the circuit simulation results of the radio-frequency signal transmitting and receiving circuit according to the comparative example.

FIG. 4 is a diagram illustrating the circuit simulation results of the radio-frequency signal transmitting and receiving circuit 10 according to the comparative example. Specifically, FIG. 4 illustrates the scattering parameter (S parameter) of the band pass filter BPF2 of the radio-frequency signal transmitting and receiving circuit 10 according to the comparative example.

A line 61 indicates the S parameter of the band pass filter BPF2. A frequency band 62 represents the frequency band of radio-frequency signals for uplink in 4G Bands 1 and 3. A frequency band 63 represents the frequency band of 4G Band 41. 4G Band 41 has a frequency range of 2496 MHz to 2690 MHz.

The band pass filter BPF2 attenuates a signal in the frequency band 62 by about −50 dB to about −65 dB. However, desirably, the radio-frequency signal transmitting and receiving circuit 10 further attenuates a signal in the frequency band 62. For example, the radio-frequency signal transmitting and receiving circuit 10 preferably attenuates a signal in the frequency band 62 by about −70 dB or more.

First Embodiment

Figure 5:
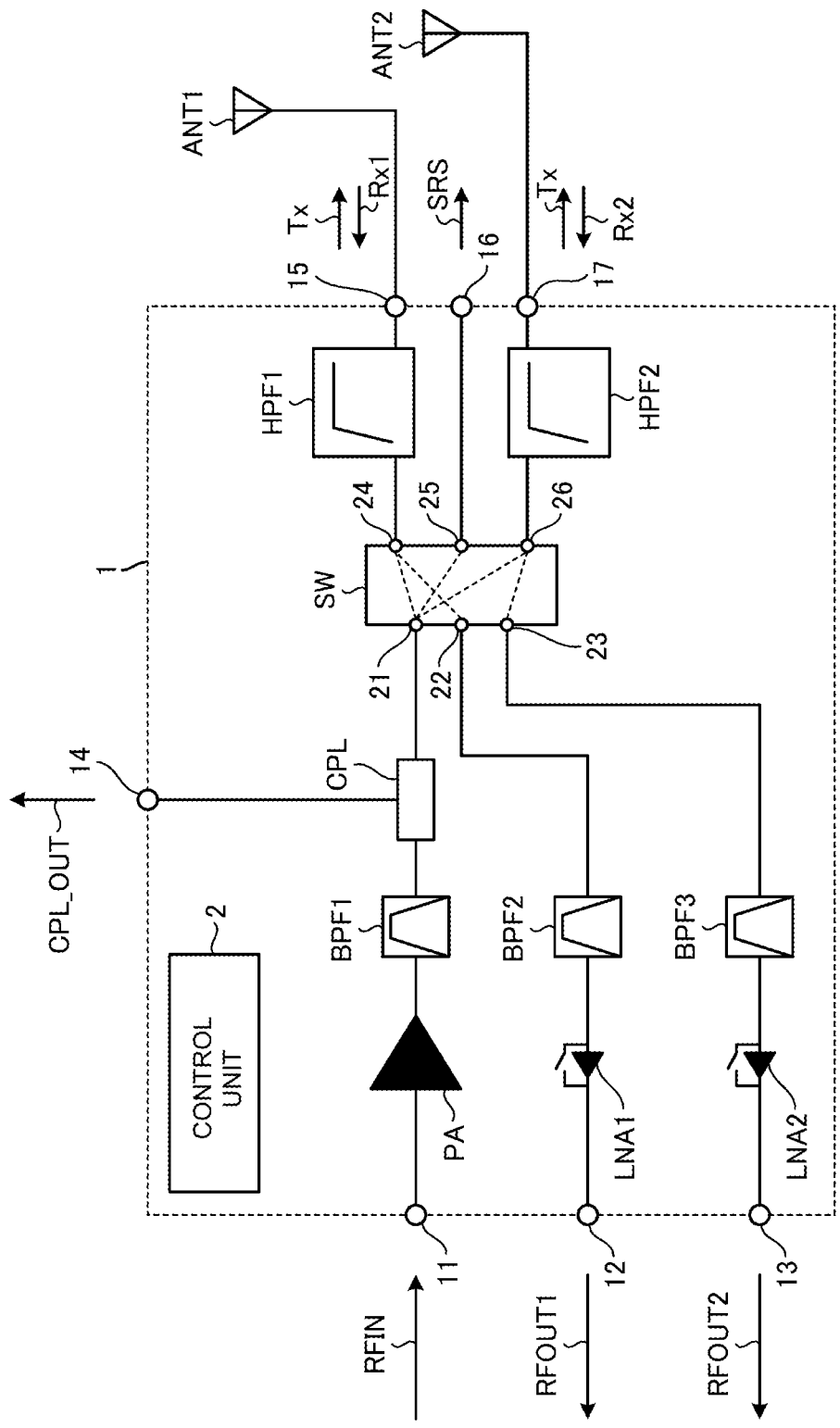
FIG. 5 is a diagram illustrating a configuration of a radio-frequency signal transmitting and receiving circuit according to a first embodiment.

FIG. 5 is a diagram illustrating a configuration of a radio-frequency signal transmitting and receiving circuit 1 according to a first embodiment.

Among the components of the radio-frequency signal transmitting and receiving circuit 1, substantially the same components as those of the radio-frequency signal transmitting and receiving circuit 10 according to the comparative example are denoted by the same reference numerals and will not be described. The radio-frequency signal transmitting and receiving circuit 1 may be implemented as a hybrid IC having a plurality of components (such as semiconductor ICs) on a single substrate, although the present disclosure is not limited thereto.

Unlike the radio-frequency signal transmitting and receiving circuit 10 according to the comparative example, the radio-frequency signal transmitting and receiving circuit 1 according to the first embodiment further includes high pass filters HPF1 and HPF2.

In the first embodiment, the radio-frequency signal transmitting and receiving circuit 1 further includes the high pass filters HPF1 and HPF2, although the present disclosure is not limited thereto. The radio-frequency signal transmitting and receiving circuit 1 may include two notch filters (band elimination filters) in place of the high pass filters HPF1 and HPF2.

The high pass filter HPF1 (or notch filter) corresponds to a "first transmitting and receiving filter" in the present disclosure. The high pass filter HPF2 (or notch filter) corresponds to a "second transmitting and receiving filter" in the present disclosure.

The high pass filters HPF1 and HPF2 are each a multi-layer inductor-capacitor (LC) filter, although the present disclosure is not limited thereto. The high pass filters HPF1 and HPF2 may be each an integrated passive device (IPD). The term "multilayer LC filter" refers to a component made of, for example, low-temperature co-fired ceramic (LTCC) or the like and having a filter function. The multilayer LC filter is produced by stacking a via-electrode or a line and a parallel flat plate to form an inductor and a capacitor. The multilayer LC filter may be implemented as an IPD.

The high pass filter HPF1 is electrically connected between the terminal 24 and the first antenna terminal 15. The high pass filter HPF2 is electrically connected between the terminal 26 and the second antenna terminal 17.

Each of the high pass filters HPF1 and HPF2 preferably transmits a radio-frequency signal in 5G band n77 and attenuates radio-frequency signals for uplink in 4G Bands 1 and 3. That is, each of the high pass filters HPF1 and HPF2 preferably transmits a radio-frequency signal in 5G band n77 (frequency range of 3300 MHz to 4200 MHz) and attenuates a radio-frequency signal for uplink in 4G Band 3 (frequency range of 1710 MHz to 1785 MHz) and a radio-frequency signal for uplink in 4G Band 1 (frequency range of 1920 MHz to 1980 MHz).

When the radio-frequency signal transmitting and receiving circuit 1 includes two notch filters in place of the high pass filters HPF1 and HPF2, each of the notch filters preferably attenuates a radio-frequency signal for uplink in 4G Band 3 (frequency range of 1710 MHz to 1785 MHz) and a radio-frequency signal for uplink in 4G Band 1 (frequency range of 1920 MHz to 1980 MHz).

Figure 6:
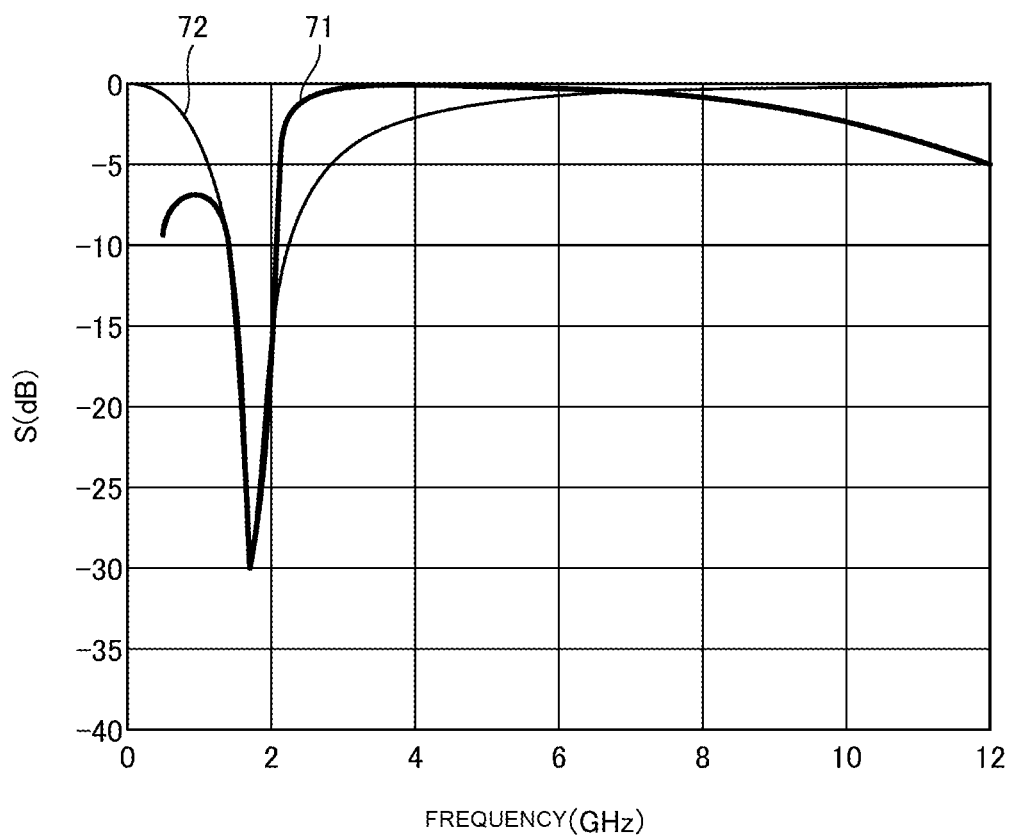
FIG. 6 is a diagram illustrating the circuit simulation results of the radio-frequency signal transmitting and receiving circuit according to the first embodiment.

FIG. 6 is a diagram illustrating the circuit simulation results of the radio-frequency signal transmitting and receiving circuit 1 according to the first embodiment. Specifically, FIG. 6 is a diagram illustrating the S parameter of the high pass filter HPF1 of the radio-frequency signal transmitting and receiving circuit 1. The S parameter of the high pass filter HPF2 is similar to that of the high pass filter HPF1.

A line 71 indicates the S parameter of the high pass filter HPF1 when the high pass filter HPF1 is formed by a multilayer LC filter. A line 72 indicates the S parameter of the high pass filter HPF1 when the high pass filter HPF1 is formed by a surface mount device (SMD).

The high pass filter HPF1 can attenuate a radio-frequency signal for uplink in 4G Band 3 (frequency range of 1710 MHz to 1785 MHz) and a radio-frequency signal for uplink in 4G Band 1 (frequency range of 1920 MHz to 1980 MHz) by up to about −30 dB both when the high pass filter HPF1 is formed by a multilayer LC filter (the line 71) and when the high pass filter HPF1 is formed by an SMD (the line 72).

When the high pass filter HPF1 is formed by an SMD (the line 72), the high pass filter HPF1 attenuates a radio-frequency signal in 5G band n77 (frequency range of 3300 MHz to 4200 MHz) by about −3.29 dB for 3300 MHz and about −1.76 dB for 4200 MHz.

When the high pass filter HPF1 is formed by a multilayer LC filter (the line 71), in contrast, the high pass filter HPF1 can reduce the attenuation of a radio-frequency signal in 5G band n77 (frequency range of 3300 MHz to 4200 MHz) merely to about −0.3 dB.

It is therefore preferable that each of the high pass filters HPF1 and HPF2 be formed by a multilayer LC filter.

It is also preferable that each of the high pass filters HPF1 and HPF2 be formed by an IPD because characteristics similar to those of the high pass filters HPF1 and HPF2, each of which is formed by a multilayer LC filter, can be achieved.

Figure 7:
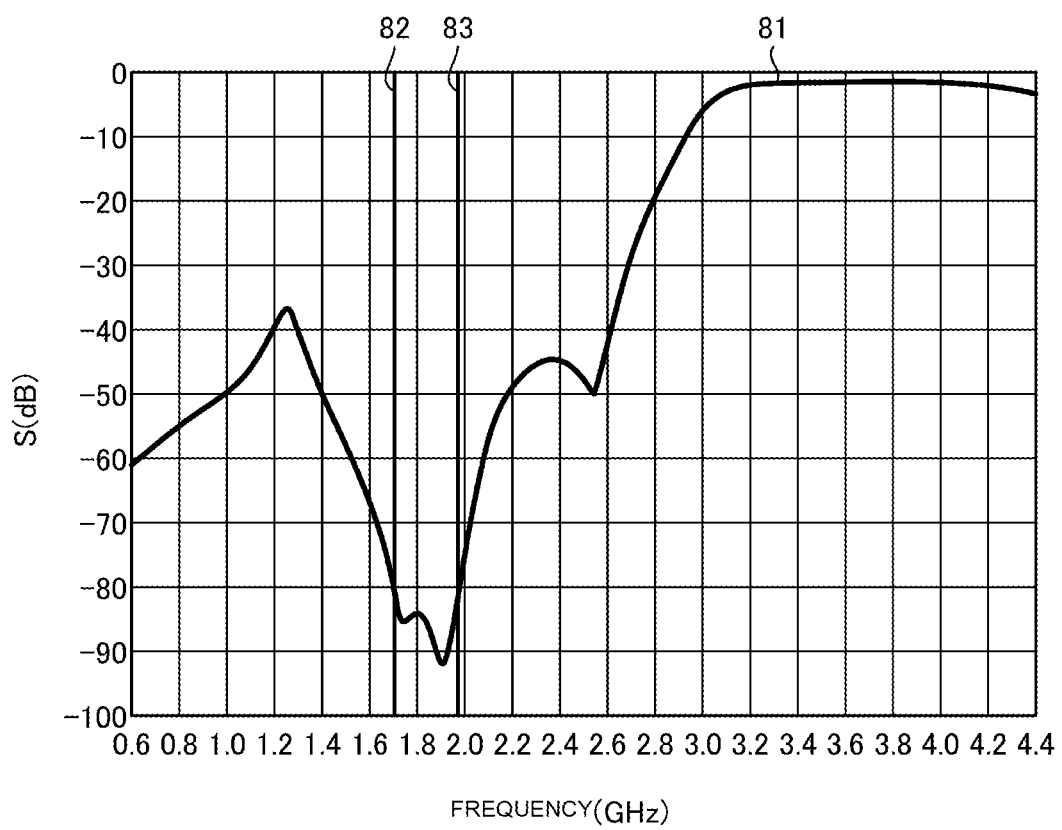
FIG. 7 is a diagram illustrating the circuit simulation results of the radio-frequency signal transmitting and receiving circuit according to the first embodiment.

FIG. 7 is a diagram illustrating the circuit simulation results of the radio-frequency signal transmitting and receiving circuit 1 according to the first embodiment. Specifically, FIG. 7 is a diagram illustrating the S parameter of a path for receiving the radio-frequency reception signal Rx1, including the high pass filter HPF1 and the band pass filter BPF2 of the radio-frequency signal transmitting and receiving circuit 1. The S parameter of a path for receiving the radio-frequency reception signal Rx2, including the high pass filter HPF2 and the band pass filter BPF3, is similar to that of the path for receiving the radio-frequency reception signal Rx1.

The phase of the high pass filter HPF1 and the phase of the band pass filter BPF2 are dependent on each other. Likewise, the phase of the high pass filter HPF2 and the phase of the band pass filter BPF3 are dependent on each other. FIG. 7 illustrates an S parameter after the respective phases of the high pass filters HPF1 and HPF2 and the band pass filters BPF2 and BPF3 are adjusted.

A line 81 indicates the S parameter of the path for receiving the radio-frequency reception signal Rx1, that is, the S parameter of the high pass filter HPF1 and the band pass filter BPF2. A line 82 indicates the lower limit (1710 MHz) of the frequencies for uplink in 4G Band 3. A line 83 indicates the upper limit (1980 MHz) of the frequencies for uplink in 4G Band 1.

As indicated by the line 81, the high pass filter HPF1 and the band pass filter BPF2 attenuate a radio-frequency signal for uplink in 4G Band 3 and a radio-frequency signal for uplink in 4G Band 1 by about −80 dB to about −90 dB.

Accordingly, the radio-frequency signal transmitting and receiving circuit 1 can reduce the signal levels of the radio-frequency signal for uplink in 4G Band 3 and the radio-frequency signal for uplink in 4G Band 1 in the radio-frequency reception signal Rx1. Thus, the radio-frequency signal transmitting and receiving circuit 1 can reduce the signal level of the second harmonic of the radio-frequency signal for uplink in 4G Band 3 and the second harmonic of the radio-frequency signal for uplink in 4G Band 1, which may be produced in the low-noise amplifiers LNA1 and LNA2. As a result, the radio-frequency signal transmitting and receiving circuit 1 can suppress the reduction in the receiving sensitivity of the preceding circuit.

The high pass filter HPF1 may be arranged between the low-noise amplifier LNA1 and the band pass filter BPF2 or between the band pass filter BPF2 and the switch SW. However, harmonics may be produced not only in the low-noise amplifier LNA1 but also in the switch SW. To suppress the harmonics which may be produced in the switch SW, the high pass filter HPF1 is preferably arranged between the switch SW and the antenna ANT1. Likewise, the high pass filter HPF2 is preferably arranged between the switch SW and the antenna ANT2.

Second Embodiment and Comparative Example

Prior to the description of the second embodiment, the comparative example will be described for ease of understanding of the second embodiment.

Comparative Example

Figure 8:
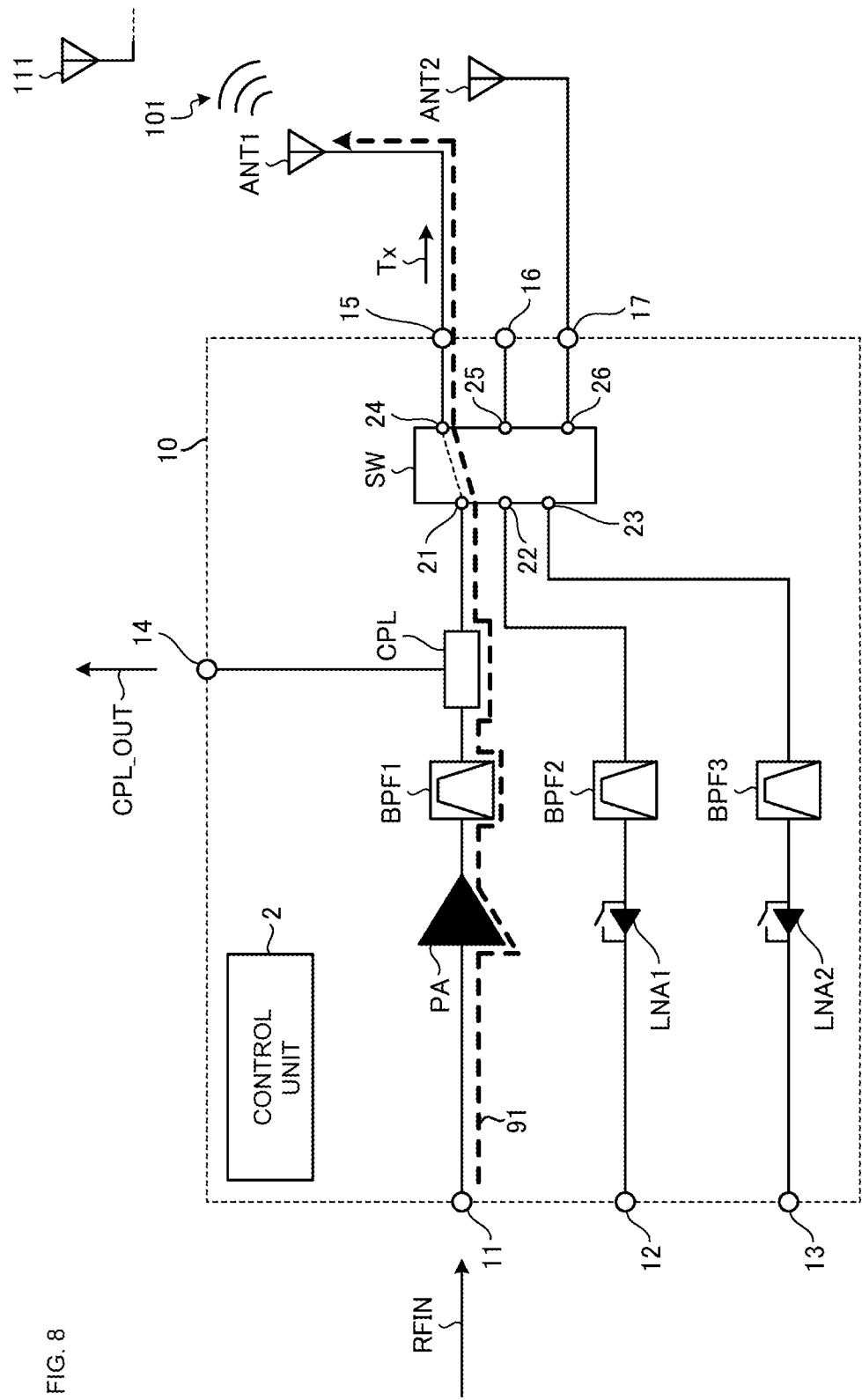
FIG. 8 is a diagram illustrating the radio-frequency signal transmitting and receiving circuit according to the comparative example during transmission.

FIG. 8 is a diagram illustrating the radio-frequency signal transmitting and receiving circuit 10 according to the comparative example during transmission. Specifically, FIG. 8 illustrates the radio-frequency signal transmitting and receiving circuit 10 when the antenna ANT1 transmits a radio wave 101 in 5G band n79. The radio wave 101 in 5G band n79 has a frequency range of 4400 MHz to 5000 MHz. An arrow 91 indicates a transmission-signal path.

The power amplifier PA amplifies a radio-frequency input signal RFIN in 5G band n79, which is inputted to the terminal 11 from the preceding circuit, and outputs the amplified radio-frequency input signal RFIN to the band pass filter BPF1.

The band pass filter BPF1 transmits the radio-frequency input signal RFIN amplified by the power amplifier PA and outputs the radio-frequency input signal RFIN to the coupler CPL. The coupler CPL detects the radio-frequency input signal RFIN transmitted through the band pass filter BPF1 and outputs a detection signal CPL OUT from the terminal 14. The radio-frequency input signal RFIN transmitted through the coupler CPL is inputted to the terminal 21 of the switch SW.

The radio-frequency input signal RFIN inputted to the terminal 21 is outputted to the antenna ANT1 as the radio-frequency transmission signal Tx via the terminal 24 and the first antenna terminal 15. When the radio-frequency transmission signal Tx is inputted, the antenna ANT1 transmits the radio wave 101 in 5G band n79 to a base station.

At this time, an antenna 111 configured to receive a radio wave in the WiFi 5-GHz band (IEEE 802.11a/n/ac/ax) receives the radio wave 101. The radio wave in the WiFi 5-GHz band has a frequency range of 5150 MHz to 5925 MHz. The antenna 111 may be included in the mobile communication device including the radio-frequency signal transmitting and receiving circuit 10 or may be included in any other device.

Figure 9:
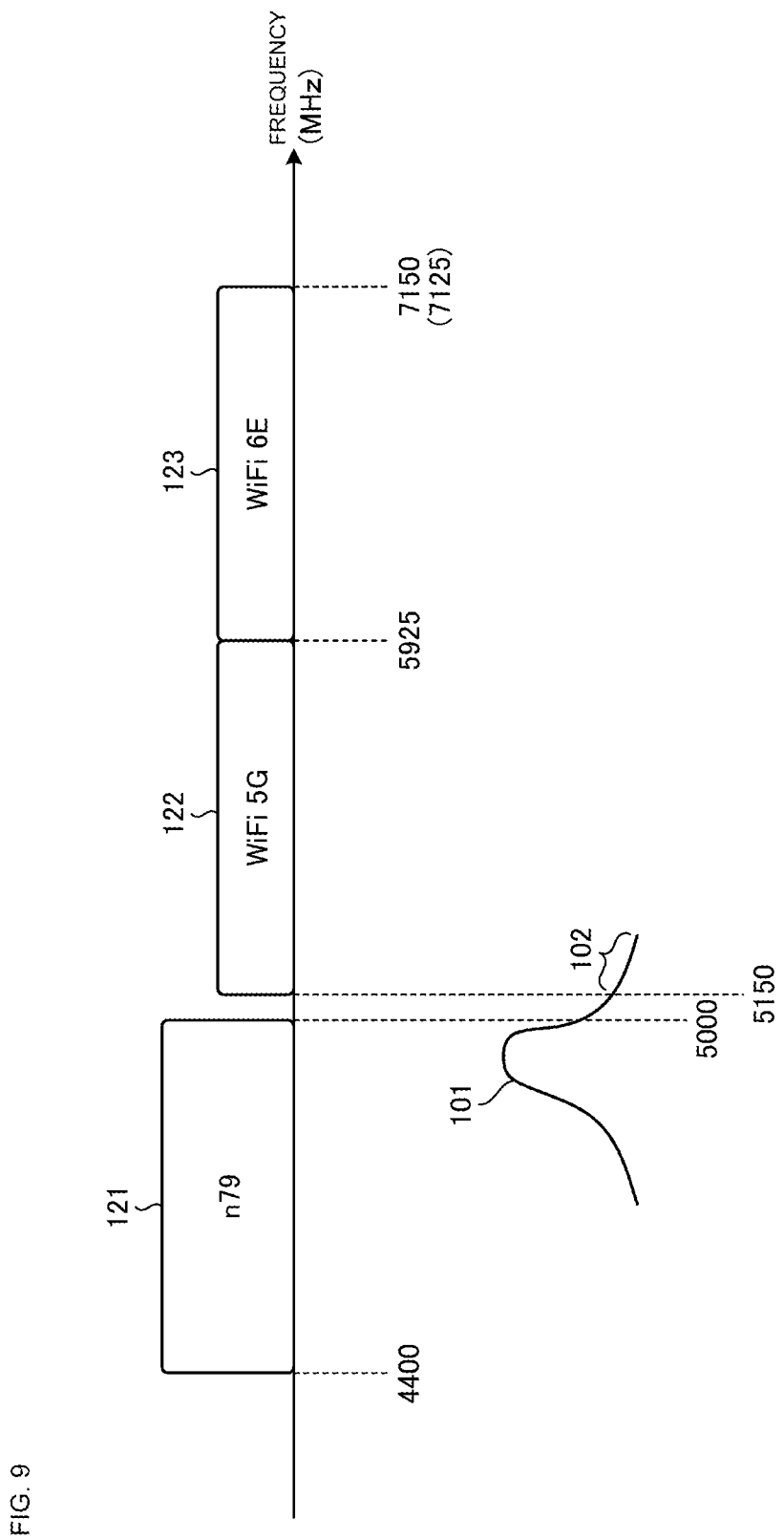
FIG. 9 is a diagram illustrating frequency bands of a radio-frequency signal in 5G band n79 and a radio-frequency signal in the WiFi 5-GHz band.

FIG. 9 is a diagram illustrating frequency bands of a radio-frequency signal in 5G band n79 and a radio-frequency signal in the WiFi 5-GHz band.

A frequency band 121 represents the frequency band of a radio-frequency signal in 5G band n79. The frequency band 121 ranges from 4400 MHz to 5000 MHz.

A frequency band 122 represents the frequency band of a radio-frequency signal in the WiFi 5-GHz band. The frequency band 122 ranges from 5150 MHz to 5925 MHz.

A frequency band 123 represents the frequency band of a radio-frequency signal in WiFi 6E. The frequency band 123 ranges from 5925 MHz to 7150 (or 7125) MHz.

The spacing between the frequency bands 121 and 122 is 150 MHz. Due to the small spacing, if the antenna ANT1 transmits the radio wave 101 having a frequency close to the upper limit (5000 MHz) of the frequency band 121, the radio wave 101 may include a frequency component 102 in the frequency band 122. In this case, the antenna 111 receives the frequency component 102, which may lead to a reduction in the receiving sensitivity of the preceding circuit (for example, an RFIC) of the antenna 111.

Second Embodiment

Figure 10:
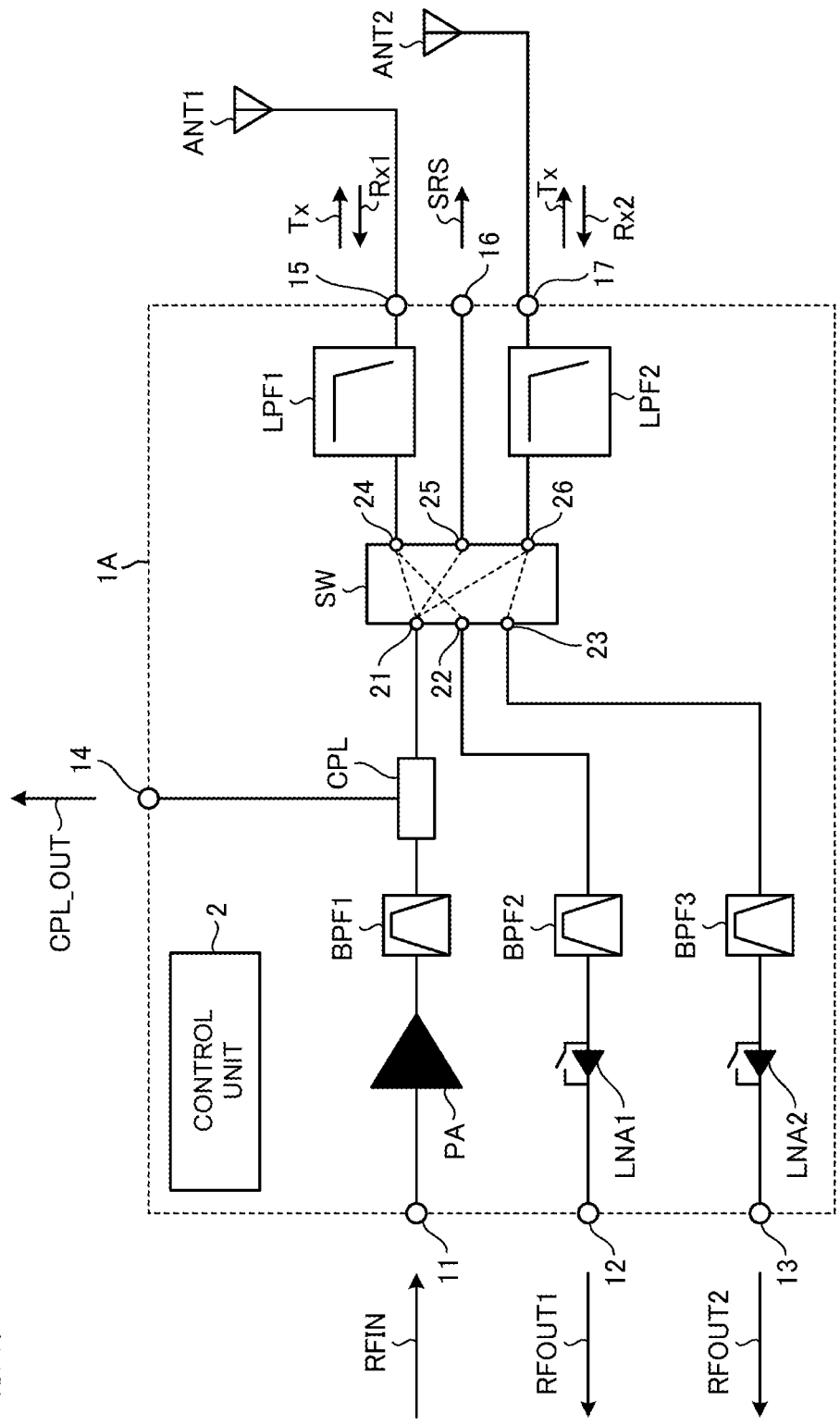
FIG. 10 is a diagram illustrating a configuration of a radio-frequency signal transmitting and receiving circuit according to a second embodiment.

FIG. 10 is a diagram illustrating a configuration of a radio-frequency signal transmitting and receiving circuit 1A according to the second embodiment.

Among the components of the radio-frequency signal transmitting and receiving circuit 1A, substantially the same components as those of the radio-frequency signal transmitting and receiving circuit 10 according to the comparative example or the radio-frequency signal transmitting and receiving circuit 1 according to the first embodiment are denoted by the same reference numerals and will not be described. The radio-frequency signal transmitting and receiving circuit 1A may be implemented as a hybrid IC having a plurality of components (such as semiconductor ICs) on a single substrate, although the present disclosure is not limited thereto.

Unlike the radio-frequency signal transmitting and receiving circuit 10 according to the comparative example, the radio-frequency signal transmitting and receiving circuit 1A according to the second embodiment further includes low pass filters LPF1 and LPF2.

In the second embodiment, the radio-frequency signal transmitting and receiving circuit 1A further includes the low pass filters LPF1 and LPF2, although the present disclosure is not limited thereto. The radio-frequency signal transmitting and receiving circuit 1A may include two notch filters (band elimination filters) in place of the low pass filters LPF1 and LPF2.

The low pass filter LPF1 (or notch filter) corresponds to a "first transmitting and receiving filter" in the present disclosure. The low pass filter LPF2 (or notch filter) corresponds to a "second transmitting and receiving filter" in the present disclosure.

The low pass filters LPF1 and LPF2 are each a multilayer LC filter, although the present disclosure is not limited thereto. The low pass filters LPF1 and LPF2 may be each an IPD.

The low pass filter LPF1 is electrically connected between the terminal 24 and the first antenna terminal 15. The low pass filter LPF2 is electrically connected between the terminal 26 and the second antenna terminal 17.

Preferably, each of the low pass filters LPF1 and LPF2 transmits a radio-frequency signal in 5G band n79 and attenuates a radio-frequency signal in the WiFi 5-GHz band. That is, preferably, each of the low pass filters LPF1 and LPF2 transmits a radio-frequency signal in 5G band n79 (frequency range of 4400 MHz to 5000 MHz) and attenuates a radio-frequency signal in the WiFi 5-GHz band (frequency range of 5150 MHz to 5925 MHz). However, each of the low pass filters LPF1 and LPF2 does not need to attenuate all radio-frequency signals in the WiFi 5-GHz band (frequency range of 5150 MHz to 5925 MHz). It is desirable that each of the low pass filters LPF1 and LPF2 attenuate radio-frequency signals having frequencies from the lower limit (5150 MHz) of the WiFi 5-GHz band to a predetermined frequency (such as about 5400 MHz or about 5500 MHz). That is, it is desirable that each of the low pass filters LPF1 and LPF2 attenuate the frequency component 102 of the radio wave 101 (see FIG. 9).

When the radio-frequency signal transmitting and receiving circuit 1A includes two notch filters in place of the low pass filters LPF1 and LPF2, each of the notch filters preferably attenuates a radio-frequency signal in the WiFi 5-GHz band (frequency range of 5150 MHz to 5925 MHz). However, each of the notch filters does not need to attenuate all radio-frequency signals in the WiFi 5-GHz band (frequency range of 5150 MHz to 5925 MHz). It is desirable that each of the notch filters attenuate radio-frequency signals having frequencies from the lower limit (5150 MHz) of the WiFi 5-GHz band to a predetermined frequency (such as about 5400 MHz or about 5500 MHz). That is, it is desirable that each of the notch filters attenuate the frequency component 102 of the radio wave 101 (see FIG. 9).

Figure 11:
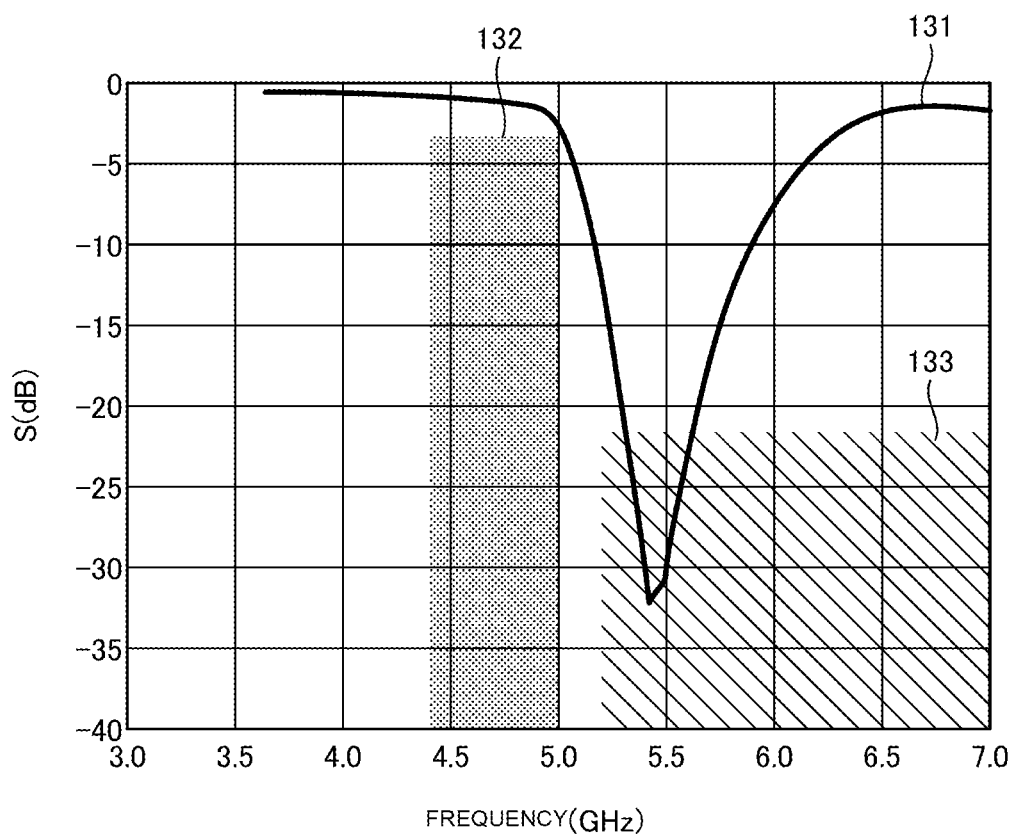
FIG. 11 is a diagram illustrating the circuit simulation results of the radio-frequency signal transmitting and receiving circuit according to the second embodiment.

FIG. 11 is a diagram illustrating the circuit simulation results of the radio-frequency signal transmitting and receiving circuit 1A according to the second embodiment. Specifically, FIG. 11 is a diagram illustrating the S parameter of the low pass filters LPF1 and LPF2 of the radio-frequency signal transmitting and receiving circuit 1A.

A line 131 indicates the S parameter when each of the low pass filters LPF1 and LPF2 is formed by a multilayer LC filter. A frequency band 132 represents the frequency band of 5G band n79. A frequency band 133 represents the frequency band of the WiFi 5-GHz band.

When each of the low pass filters LPF1 and LPF2 is formed by an IPD, characteristics similar to those when each of the low pass filters LPF1 and LPF2 is formed by a multilayer LC filter can be obtained.

As indicated by the line 131, each of the low pass filters LPF1 and LPF2 transmits a radio-frequency signal in 5G band n79. Each of the low pass filters LPF1 and LPF2 attenuates a radio-frequency signal having a frequency of 5.4 GHz in the frequency band 133 corresponding to the WiFi 5-GHz band by about −33 dB.

Accordingly, when transmitting the radio-frequency transmission signal Tx in 5G band n79, the radio-frequency signal transmitting and receiving circuit 1A can reduce the signal level of the radio-frequency signal in the WiFi 5-GHz band. As a result, the radio-frequency signal transmitting and receiving circuit 1A can suppress the reduction in the receiving sensitivity of any other circuit that receives a radio wave in the WiFi 5-GHz band.

The low pass filter LPF1 may be arranged between the power amplifier PA and the band pass filter BPF1 or between the band pass filter BPF1 and the switch SW. However, the antenna ANT1 may also receive a radio wave in the WiFi 5-GHz band when receiving a radio wave in 5G band n79. It is therefore preferable that the low pass filter LPF1 be arranged between the switch SW and the antenna ANT1 so as to attenuate a radio-frequency signal in the WiFi 5-GHz band in the radio-frequency reception signal Rx1. Likewise, the low pass filter LPF2 is preferably arranged between the switch SW and the antenna ANT2.

Third Embodiment

Figure 12:
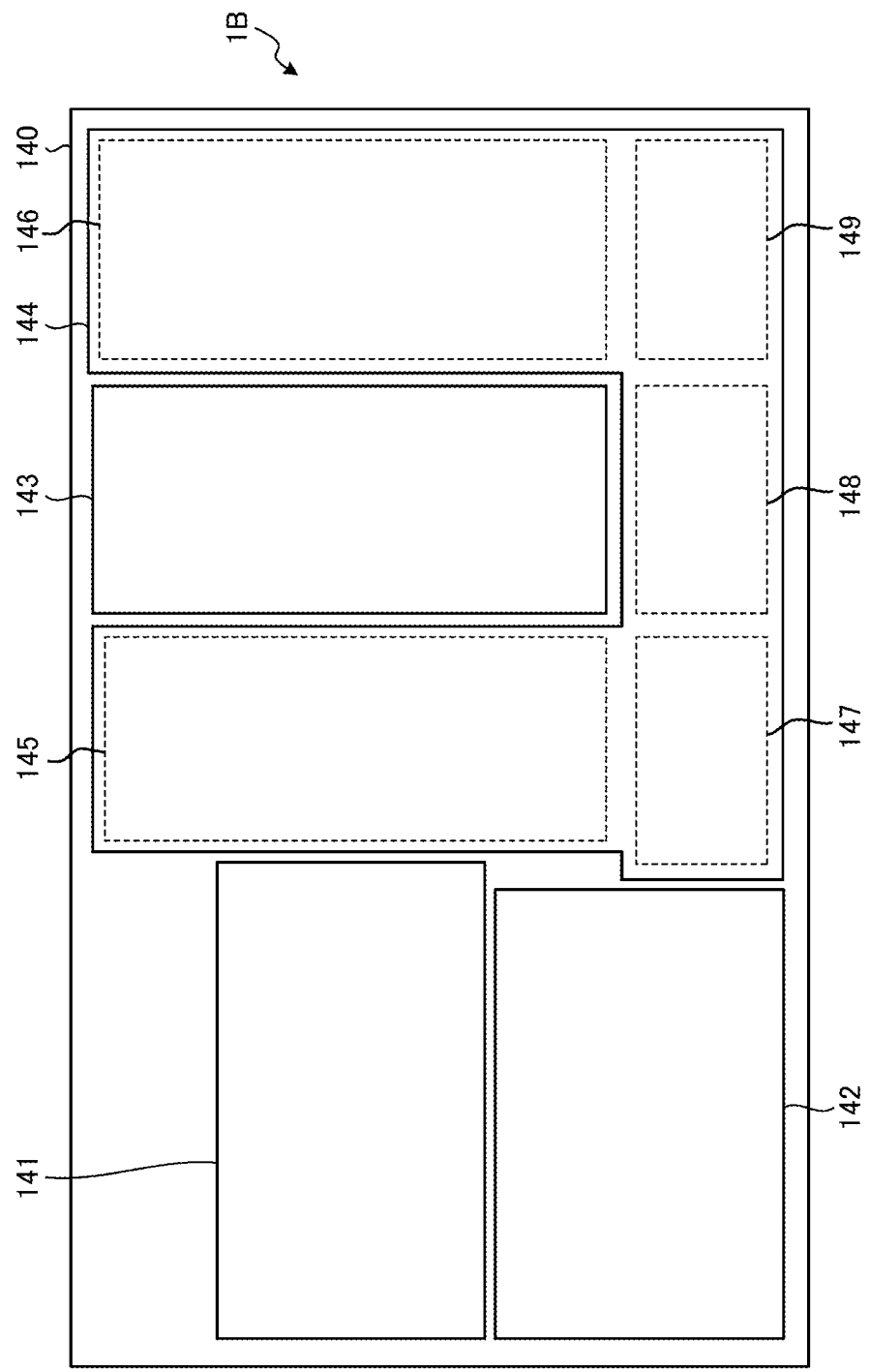
FIG. 12 is a diagram illustrating an example layout of a radio-frequency signal transmitting and receiving circuit according to a third embodiment.

FIG. 12 is a diagram illustrating an example layout of a radio-frequency signal transmitting and receiving circuit 1B according to a third embodiment. The circuit configuration of the radio-frequency signal transmitting and receiving circuit 1B according to the third embodiment is similar to that of the radio-frequency signal transmitting and receiving circuit 1 according to the first embodiment (see FIG. 5) or the radio-frequency signal transmitting and receiving circuit 1A according to the second embodiment (see FIG. 10) and is not illustrated in the drawings or described.

The radio-frequency signal transmitting and receiving circuit 1B has a substrate 140. The substrate 140 may be a non-semiconductor substrate such as a printed circuit board (PCB) or an LTCC substrate, or may be a semiconductor chip (semiconductor substrate).

The substrate 140 includes an area 141 in which the power amplifier PA is arranged, an area 142 in which the control unit 2 is arranged, an area 143 in which the switch SW and the low-noise amplifiers LNA1 and LNA2 are arranged, and an area 144 in which the band pass filters BPF1, BPF2, and BPF3, a first transmitting and receiving filter (the high pass filter HPF1 or the low pass filter LPF1), and a second transmitting and receiving filter (the high pass filter HPF2 or the low pass filter LPF2) are arranged.

The area 143 has a substantially quadrilateral shape (for example, a substantially rectangular shape) having short sides extending in the X direction and long sides extending in the Y direction. The area 144 has a substantially U shape surrounding the two long sides and one short side of the area 143.

The area 143 corresponds to a "first area" in the present disclosure. The area 144 corresponds to a "second area" in the present disclosure.

The radio-frequency reception signals Rx1 and Rx2 have lower signal levels than the radio-frequency transmission signal Tx. For this reason, the band pass filters BPF2 and BPF3 are preferably arranged near the switch SW and the low-noise amplifiers LNA1 and LNA2. Preferably, the band pass filters BPF2 and BPF3 are isolated from each other. Thus, the band pass filters BPF2 and BPF3 are preferably arranged with the area 143 interposed therebetween. It is therefore preferable that one of the band pass filters BPF2 and BPF3 be arranged in an area 145 facing one of the long sides of the area 143 and that the other of the band pass filters BPF2 and BPF3 be arranged in an area 146 facing the other long side of the area 143.

One of the areas 145 and 146 corresponds to a "third area" in the present disclosure. The other of the areas 145 and 146 corresponds to a "fourth area" in the present disclosure.

The remaining components, namely, the band pass filter BPF1, the first transmitting and receiving filter, and the second transmitting and receiving filter, are arranged in sub-areas of the area 144, namely, an area 147 facing one short side of the area 145, an area 148 facing the short side of the area 143, and an area 149 facing one short side of the area 146. As an example, the band pass filter BPF1 is arranged in the area 147, the first transmitting and receiving filter (the high pass filter HPF1 or the low pass filter LPF1) is arranged in the area 148, and the second transmitting and receiving filter (the high pass filter HPF2 or the low pass filter LPF2) is arranged in the area 149.

Figure 13:
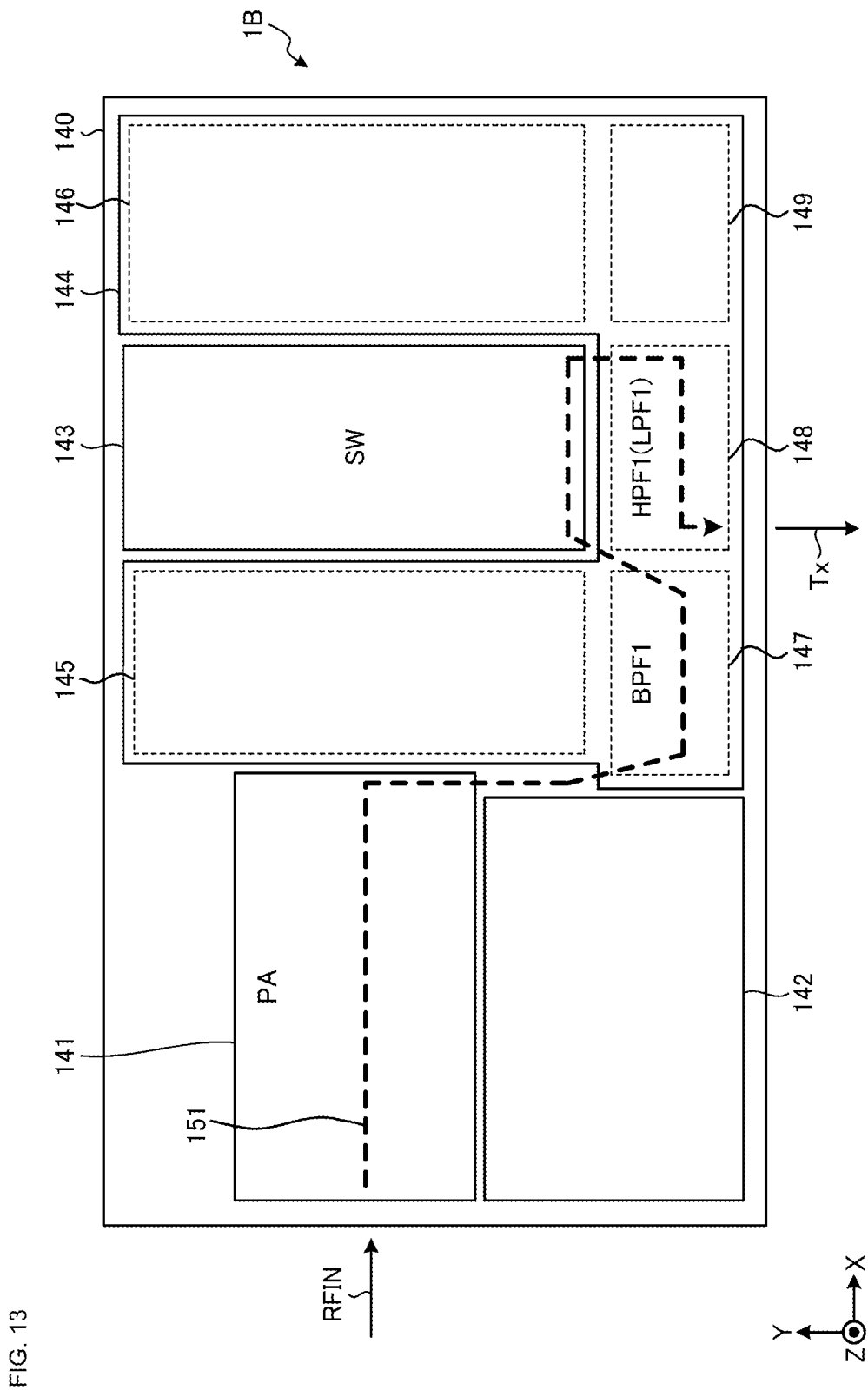
FIG. 13 is a diagram illustrating an example of the radio-frequency signal transmitting and receiving circuit according to the third embodiment during transmission.

FIG. 13 is a diagram illustrating an example of the radio-frequency signal transmitting and receiving circuit 1B according to the third embodiment during transmission. An arrow 151 indicates a transmission-signal path.

The power amplifier PA arranged in the area 141 amplifies the radio-frequency input signal RFIN and outputs the amplified radio-frequency input signal RFIN to the band pass filter BPF1 arranged in the area 147. The band pass filter BPF1 transmits the radio-frequency input signal RFIN amplified by the power amplifier PA and outputs the radio-frequency input signal RFIN to the switch SW arranged in the area 143. The radio-frequency input signal RFIN transmitted through the switch SW is inputted to the first transmitting and receiving filter (the high pass filter HPF1 or the low pass filter LPF1) arranged in the area 148. The first transmitting and receiving filter (the high pass filter HPF1 or the low pass filter LPF1) transmits the radio-frequency input signal RFIN (high-pass filtration or low-pass filtration) and outputs the radio-frequency input signal RFIN as the radio-frequency transmission signal Tx.

Figure 14:
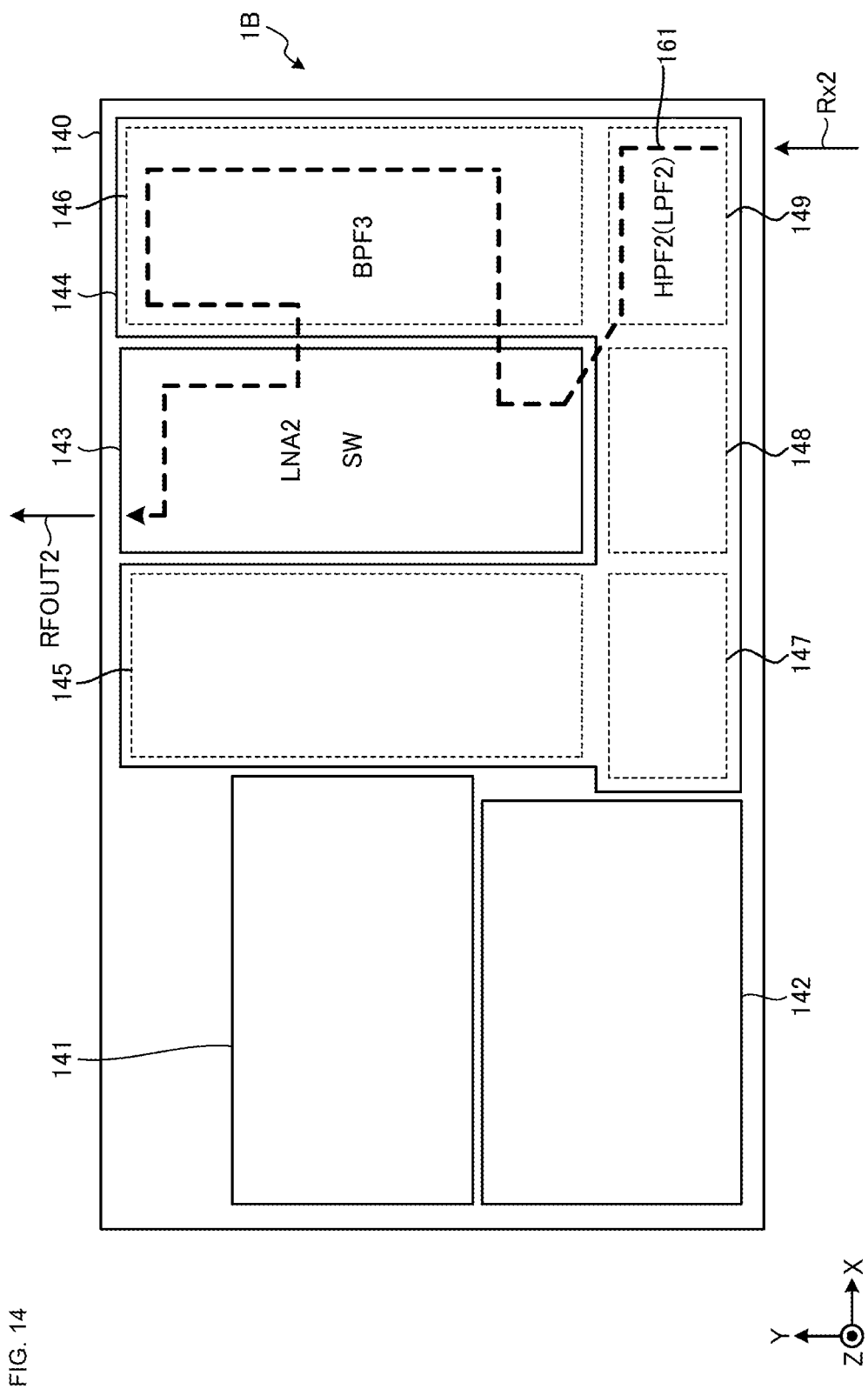
FIG. 14 is a diagram illustrating an example of the radio-frequency signal transmitting and receiving circuit according to the third embodiment during reception.

FIG. 14 is a diagram illustrating an example of the radio-frequency signal transmitting and receiving circuit 1B according to the third embodiment during reception. An arrow 161 indicates a received-signal path.

The second transmitting and receiving filter (the high pass filter HPF2 or the low pass filter LPF2) arranged in the area 149 transmits the radio-frequency reception signal Rx2 (high-pass filtration or low-pass filtration) and outputs the radio-frequency reception signal Rx2 to the switch SW arranged in the area 143. The radio-frequency reception signal Rx2 transmitted through the switch SW is inputted to the band pass filter BPF3 arranged in the area 146. The band pass filter BPF3 transmits the radio-frequency reception signal Rx2 and outputs the radio-frequency reception signal Rx2 to the low-noise amplifier LNA2 arranged in the area 143. The low-noise amplifier LNA2 amplifies the radio-frequency reception signal Rx2 and outputs the radio-frequency output signal RFOUT2.

The embodiments described above are intended to facilitate understanding of the present disclosure and are not to be construed as limiting the present disclosure. The present disclosure may be modified or improved without departing from the spirit thereof, and the present disclosure also includes equivalents thereof.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A radio-frequency signal transmitting and receiving circuit, comprising:
    a power amplifier configured to amplify a radio-frequency input signal;
    a transmission band pass filter configured to pass the radio-frequency input signal amplified by the power amplifier;
    a first reception band pass filter configured to pass a first radio-frequency reception signal;
    a first low-noise amplifier configured to amplify the first radio-frequency reception signal passed through the first reception band pass filter, and to output a first radio-frequency output signal;
    a first transmitting and receiving filter having a first end and a second end, the first end being electrically connected to a first antenna terminal, the first transmitting and receiving filter being configured to pass the radio-frequency input signal and the first radio-frequency reception signal, and to attenuate a radio-frequency signal having a frequency that is different from the radio-frequency input signal or the first radio-frequency reception signal; and
    a switch configured to selectively:
        electrically connect the transmission band pass filter to the second end of the first transmitting and receiving filter, such that the radio-frequency input signal is output to the first antenna terminal as a radio-frequency transmission signal, and
        electrically connect the second end of the first transmitting and receiving filter to the first reception band pass filter, such that the first radio-frequency reception signal is received from the first antenna terminal.

2. The radio-frequency signal transmitting and receiving circuit according to claim 1, wherein:
    the radio-frequency input signal and the first radio-frequency reception signal are radio-frequency signals in band n77 for a fifth-generation mobile communication system, and
    the first transmitting and receiving filter is configured to pass the radio-frequency input signal and the first radio-frequency reception signal, and to attenuate a radio-frequency signal for uplink in Band 3 for a fourth-generation mobile communication system and a radio-frequency signal for uplink in Band 1 for the fourth-generation mobile communication system.

3. The radio-frequency signal transmitting and receiving circuit according to claim 2, wherein the first transmitting and receiving filter is a high pass filter or a notch filter.

4. The radio-frequency signal transmitting and receiving circuit according to claim 1, further comprising:
    a second reception band pass filter configured to pass a second radio-frequency reception signal;
    a second low-noise amplifier configured to amplify the second radio-frequency reception signal passed through the second reception band pass filter, and to output a second radio-frequency output signal; and
    a second transmitting and receiving filter having a first end and a second end, the first end being electrically connected to a second antenna terminal, the second transmitting and receiving filter being configured to pass the radio-frequency input signal and the second radio-frequency reception signal, and to attenuate a radio-frequency signal having a frequency that is different from the radio-frequency input signal or the second radio-frequency reception signal, wherein the switch is further configured to selectively:

electrically connect the transmission band pass filter to the second end of the second transmitting and receiving filter, such that the radio-frequency input signal is output to the second antenna terminal as the radio-frequency transmission signal, and electrically connect the second end of the second transmitting and receiving filter to the second reception band pass filter, such that the second radio-frequency reception signal is received from the second antenna terminal.

5. The radio-frequency signal transmitting and receiving circuit 2 according to claim 2, further comprising:

a second reception band pass filter configured to pass a second radio-frequency reception signal;

a second low-noise amplifier configured to amplify the second radio-frequency reception signal passed through the second reception band pass filter, and to output a second radio-frequency output signal; and a second transmitting and receiving filter having a first end and a second end, the first end being electrically connected to a second antenna terminal, the second transmitting and receiving filter being configured to pass the radio-frequency input signal and the second radio-frequency reception signal, and to attenuate a radio-frequency signal having a frequency that is different from the radio-frequency input signal or the second radio-frequency reception signal, wherein the switch is further configured to selectively:

electrically connect the transmission band pass filter to the second end of the second transmitting and receiving filter, such that the radio-frequency input signal is output to the second antenna terminal as the radio-frequency transmission signal, and electrically connect the second end of the second transmitting and receiving filter to the second reception band pass filter, such that the second radio-frequency reception signal is received from the second antenna terminal.

6. The radio-frequency signal transmitting and receiving circuit according to claim 3, further comprising:

a second reception band pass filter configured to pass a second radio-frequency reception signal;

a second low-noise amplifier configured to amplify the second radio-frequency reception signal passed through the second reception band pass filter, and to output a second radio-frequency output signal; and a second transmitting and receiving filter having a first end and a second end, the first end being electrically connected to a second antenna terminal, the second transmitting and receiving filter being configured to pass the radio-frequency input signal and the second radio-frequency reception signal, and to attenuate a radio-frequency signal having a frequency that is different from the radio-frequency input signal or the second radio-frequency reception signal, wherein the switch is further configured to selectively:

electrically connect the transmission band pass filter to the second end of the second transmitting and receiving filter, such that the radio-frequency input signal is output to the second antenna terminal as the radio-frequency transmission signal, and electrically connect the second end of the second transmitting and receiving filter to the second reception band pass filter, such that the second radio-frequency reception signal is received from the second antenna terminal.

7. The radio-frequency signal transmitting and receiving circuit according to claim 4, wherein:

the radio-frequency input signal and the second radio-frequency reception signal are radio-frequency signals in band n77 for a fifth-generation mobile communication system, and the second transmitting and receiving filter is configured to pass the radio-frequency input signal and the second radio-frequency reception signal, and to attenuate a radio-frequency signal for uplink in Band 3 for a fourth-generation mobile communication system and a radio-frequency signal for uplink in Band 1 for the fourth-generation mobile communication system.

8. The radio-frequency signal transmitting and receiving circuit according to claim 5, wherein:

the radio-frequency input signal and the second radio-frequency reception signal are radio-frequency signals in band n77 for a fifth-generation mobile communication system, and the second transmitting and receiving filter is configured to pass the radio-frequency input signal and the second radio-frequency reception signal, and to attenuate a radio-frequency signal for uplink in Band 3 for a fourth-generation mobile communication system and a radio-frequency signal for uplink in Band 1 for the fourth-generation mobile communication system.

9. The radio-frequency signal transmitting and receiving circuit according to claim 6, wherein:

the radio-frequency input signal and the second radio-frequency reception signal are radio-frequency signals in band n77 for a fifth-generation mobile communication system, and the second transmitting and receiving filter is configured to pass the radio-frequency input signal and the second radio-frequency reception signal, and to attenuate a radio-frequency signal for uplink in Band 3 for a fourth-generation mobile communication system and a radio-frequency signal for uplink in Band 1 for the fourth-generation mobile communication system.

10. The radio-frequency signal transmitting and receiving circuit according to claim 7, wherein the second transmitting and receiving filter is a high pass filter or a notch filter.

11. The radio-frequency signal transmitting and receiving circuit according to claim 8, wherein the second transmitting and receiving filter is a high pass filter or a notch filter.

12. The radio-frequency signal transmitting and receiving circuit according to claim 9, wherein the second transmitting and receiving filter is a high pass filter or a notch filter.

13. The radio-frequency signal transmitting and receiving circuit according to claim 1, wherein the first low-noise amplifier and the switch are located in a quadrilaterally-shaped first area of a substrate, and wherein the transmission band pass filter, the first reception band pass filter, and the first transmitting and receiving filter are located in a U-shaped second area of the substrate, the U-shaped second area at least partially surrounding the quadrilaterally-shaped first area.

14. The radio-frequency signal transmitting and receiving circuit according to claim 4, wherein the first low-noise amplifier, the second low-noise amplifier, and the switch are located in a quadrilaterally-shaped first area of a substrate, and wherein the transmission band pass filter, the first reception band pass filter, the second reception band pass filter, the first transmitting and receiving filter, and the second transmitting and receiving filter are, located in a U-shaped second area of the substrate, the U-shaped second area at least partially surrounding the quadrilaterally-shaped first area.

15. The radio-frequency signal transmitting and receiving circuit according to claim 2, wherein the first low-noise amplifier, the second low-noise amplifier, and the switch are located in a quadrilaterally-shaped first area of a substrate, and wherein the transmission band pass filter, the first reception band pass filter, the second reception band pass filter, the first transmitting and receiving filter, and the second transmitting and receiving filter are, located in a U-shaped second area of the substrate, the U-shaped second area at least partially surrounding the quadrilaterally-shaped first area.

16. The radio-frequency signal transmitting and receiving circuit according to claim 5, wherein the first low-noise amplifier, the second low-noise amplifier, and the switch are located in a quadrilaterally-shaped first area of a substrate, and wherein the transmission band pass filter, the first reception band pass filter, the second reception band pass filter, the first transmitting and receiving filter, and the second transmitting and receiving filter are, located in a U-shaped second area of the substrate, the U-shaped second area at least partially surrounding the quadrilaterally-shaped first area.

* * * * *

UNITED STATES PATENT AND TRADEMARK OFFICE
CERTIFICATE OF CORRECTION

| | |
|---|---|
| PATENT NO. | : 11,349,521 B2 |
| APPLICATION NO. | : 17/235309 |
| DATED | : May 31, 2022 |
| INVENTOR(S) | : Kenji Tahara et al. |

It is certified that error appears in the above-identified patent and that said Letters Patent is hereby corrected as shown below:

In the Claims

Claim 5, Column 15, Line 18:
"circuit 2 according to claim 2," should be --circuit according to claim 2,--

Signed and Sealed this
Eighteenth Day of April, 2023

Katherine Kelly Vidal
*Director of the United States Patent and Trademark Office*